(12) United States Patent
Cheung

(10) Patent No.: US 10,157,104 B2
(45) Date of Patent: Dec. 18, 2018

(54) LARGE FOLDER OPERATIONS IN A COLLABORATIVE CLOUD-BASED ENVIRONMENT

(71) Applicant: Box, Inc., Redwood City, CA (US)

(72) Inventor: Michael Cheung, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 185 days.

(21) Appl. No.: 15/088,002

(22) Filed: Mar. 31, 2016

(65) Prior Publication Data

US 2017/0286229 A1 Oct. 5, 2017

(51) Int. Cl.
*G06F 17/30* (2006.01)
*G06F 11/14* (2006.01)
*G06F 21/62* (2013.01)

(52) U.S. Cl.
CPC .... *G06F 11/1451* (2013.01); *G06F 17/30115* (2013.01); *G06F 17/30171* (2013.01); *G06F 21/6218* (2013.01); *G06F 2221/2147* (2013.01)

(58) Field of Classification Search
CPC ............................................... G06F 17/30115
USPC ................................................ 707/622, 684
See application file for complete search history.

(56) References Cited

U.S. PATENT DOCUMENTS 5,933,825 A * 8/1999 McClaughry ....... G06F 11/1435
707/8

2010/0306188 A1* 12/2010 Cunningham .... G06F 17/30463
707/713
2014/0059002 A1* 2/2014 Lockhart .......... G06F 17/30174
707/622
2014/0379648 A1* 12/2014 Chiu ................ G06F 17/30174
707/624

OTHER PUBLICATIONS

"How to Extract Images From a Google Docs Document". Tech Tips, Jan. 22, 2011, http://techattitude.com/tips-tricks-and-hacks/how-to-extract-images-from-google-docs-document/. Accessed Jul. 28, 2018.

(Continued)

*Primary Examiner* — Chelcie Daye
(74) *Attorney, Agent, or Firm* — Vista IP Law Group, LLP

(57) ABSTRACT

Systems for managing operating on folders that comprise a large number of objects in a cloud-based collaboration platform. A cloud-based environment includes storage devices that store content objects accessible by collaborating users. The content objects are identified by one or more hierarchical path identifiers comprising a folder identifier corresponding to a logical grouping. The hierarchical path identifiers are stored in a relational database. Methods receive an operation command from a user to operate on the content objects associated with the logical grouping, after which a relational database search query is generated. Processing of the query returns a plurality of result sets corresponding to respective portions of the content objects associated with the logical grouping. The operation command is applied iteratively over the plurality of result sets, and the command is finalized after the last iteration. Collaborators can perform certain operations on content objects even while the iterations are in progress.

20 Claims, 15 Drawing Sheets

(56) References Cited

OTHER PUBLICATIONS

"Manage lists and libraries with many items". Microsoft, 2015, https://support.office.com/en-us/article/Manage-lists-and-libraries-with-many-items-b8588dae-9387-48c2-9248-c24122f07c59, Accessed Dec. 10, 2015.

"Designing large lists and maximizing list performance (SharePoint Server 2010)". Microsoft TechNet, Sep. 24, 2011, https://technet.microsoft.com/en-us/library/cc262813(v=office.14).aspx, Accessed Dec. 10, 2015.

\* cited by examiner

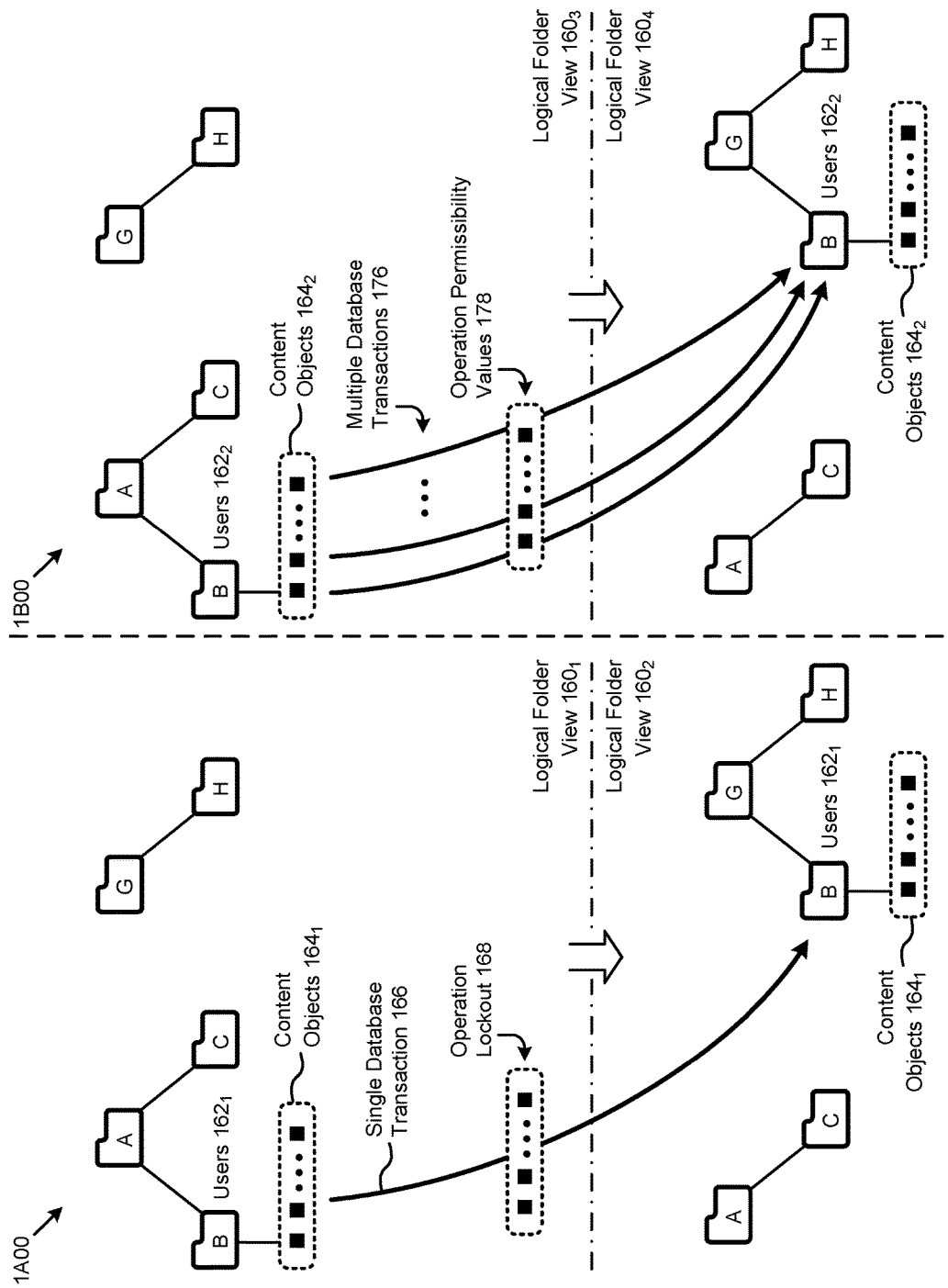

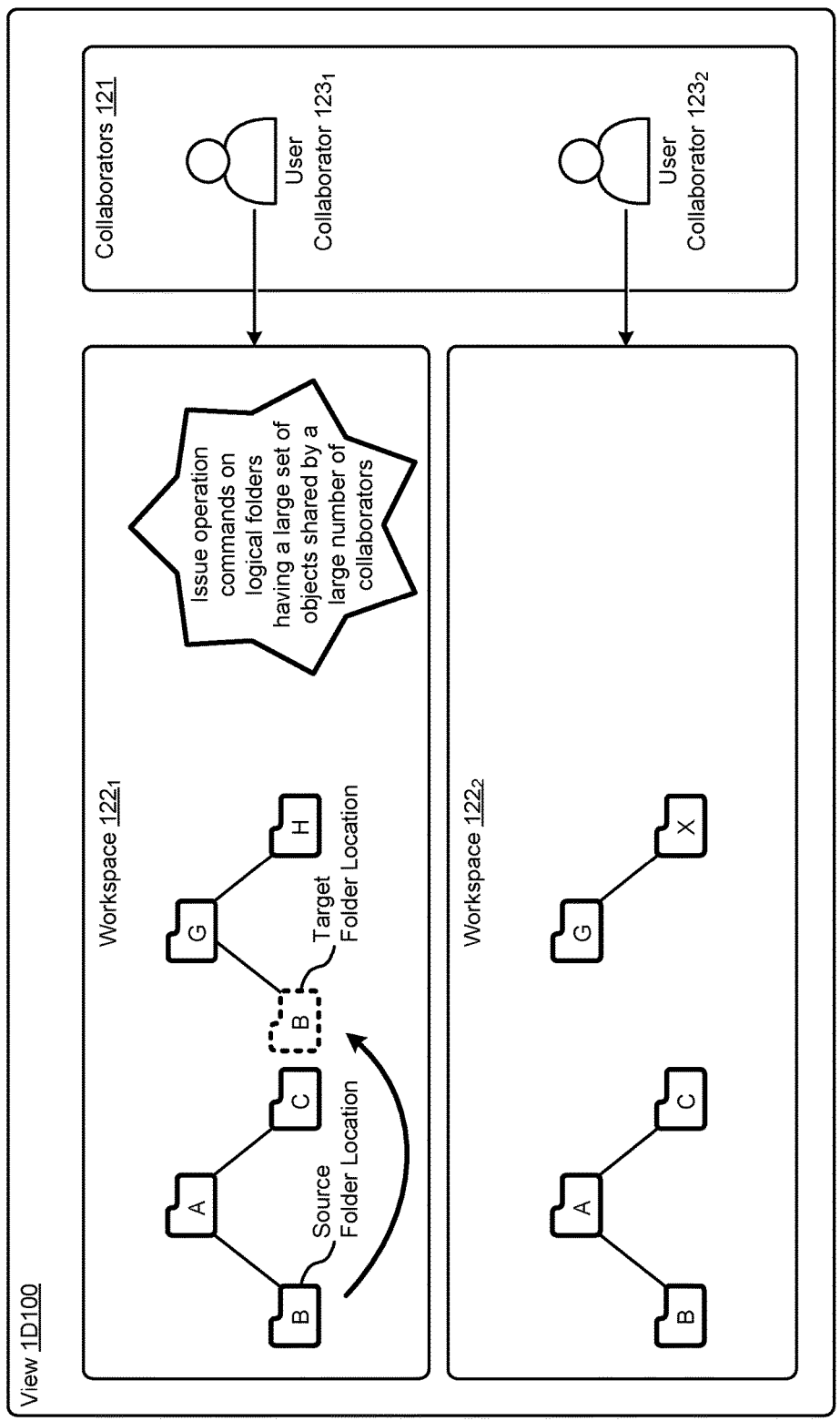
FIG. 1D1

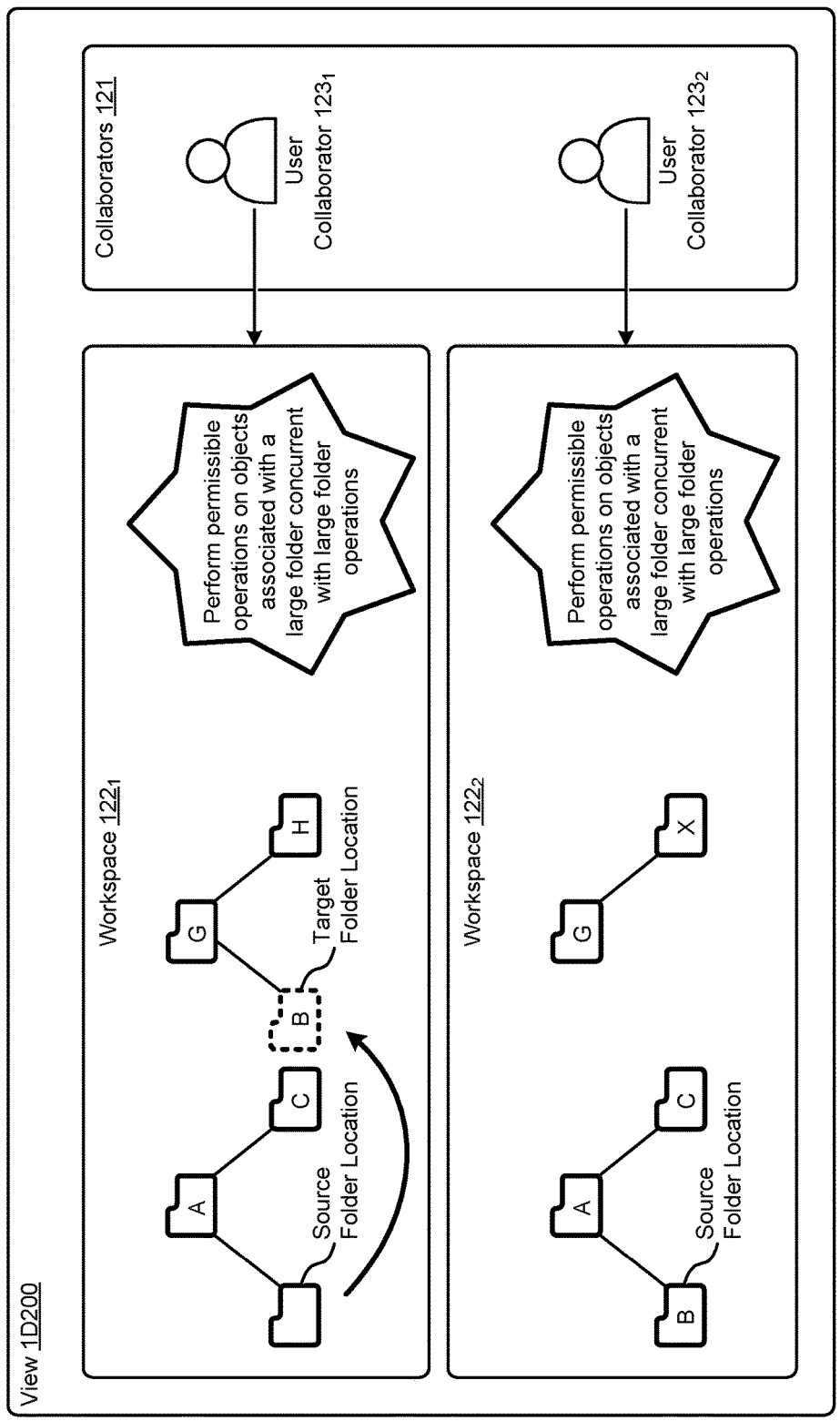
FIG. 1D2

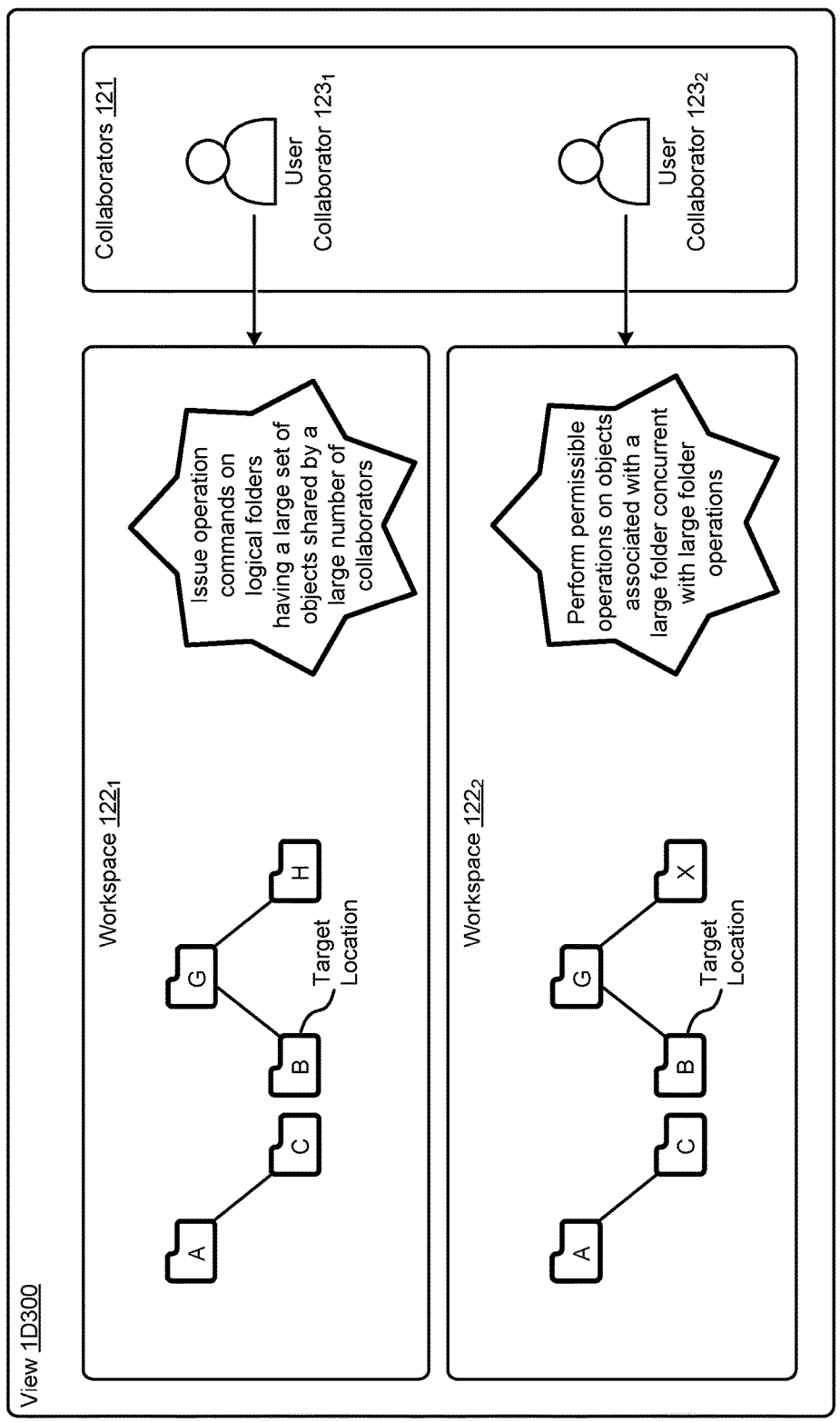
FIG. 1D3

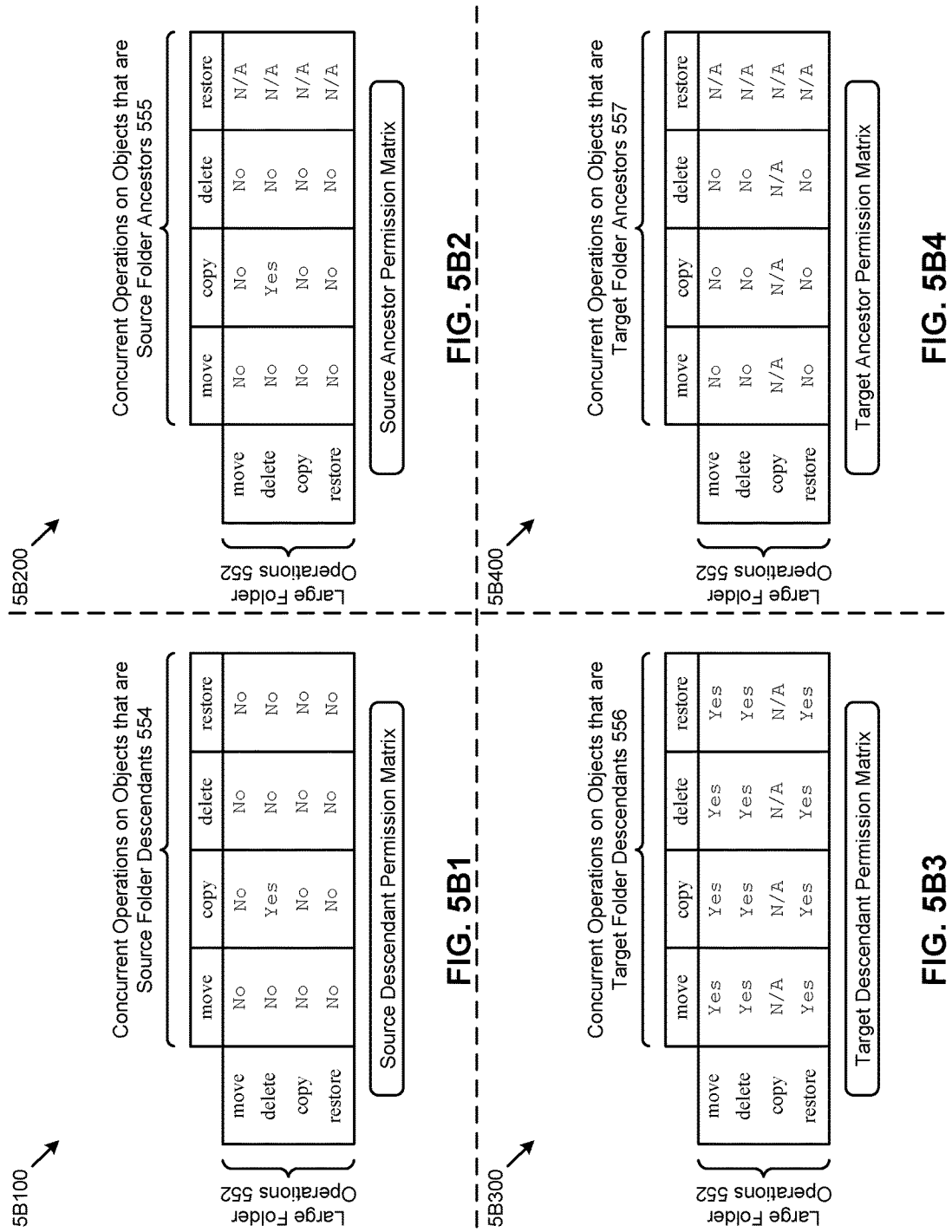
FIG. 5B1 · FIG. 5B2 · FIG. 5B3 · FIG. 5B4

LARGE FOLDER OPERATIONS IN A COLLABORATIVE CLOUD-BASED ENVIRONMENT

FIELD

This disclosure relates to managing content in a cloud-based service platform, and more particularly to techniques for performing large folder operations in a highly collaborative cloud-based environment.

BACKGROUND

Cloud-based content management services and platforms have changed the way personal and corporate electronically stored information objects (e.g., files, images, videos, etc.) are stored, and has also changed the way such personal and corporate content is shared and managed. Some cloud-based systems facilitate access and/or collaboration related to such objects by storing information associated with the objects in a relational database. For example, a row in a table comprising the relational database might correspond to a file, while another row might correspond to a folder. Other attributes (e.g., columns) in the tables can describe logical relationships among the objects (e.g., file A is a child of folder B). As the usage of cloud-based systems increases, the number of objects in a given folder and/or the number of collaborators of such objects and/or folders commensurately increases. In such cases, the database transactions associated with certain folder operations (e.g., delete, move, copy, restore, etc.) over such large folders can result in increasingly longer transaction durations and, in some cases, transaction failure.

Unfortunately, legacy approaches for implementing large folder operations in the foregoing environments can be deficient at least as pertaining to transaction latency, collaborator efficiency, computer resource usage efficiency, and other factors. Specifically, such legacy approaches might run a single database transaction for each folder operation. However, handling a folder operation in a single database transaction can precipitate several problems. For example, as the size of the operation increases, the latency of the transaction also increases. In some cases, a single database transaction for a large folder operation can take many hours or days to process. Locks on the objects involved in the transaction might also be enforced while the transaction executes, resulting in many collaborators having limited or no access to the objects during the folder operation (e.g., for hours, days, etc.), which in turn decreases collaborator efficiency and satisfaction. The number and duration of concurrent locks maintained can lead to increased lock contention, which can in turn lead to decreased database performance. As more long-running transactions are introduced, an increase in computing resources (e.g., memory, disk space, etc.) may be required so as to manage the increase in the number of concurrent locks. Further, lock contention latency as well as the number and scope of concurrent locks maintained at any given moment in time can increase with such legacy approaches, resulting, for example, in an increase in the number of lock wait timeout errors experienced by other contending operation requests. In some cases, an impatient collaborator might invoke a large folder operation multiple times (e.g., thinking the first operation "didn't take"), thus further exacerbating the aforementioned deleterious effects.

Tracking non-committed changes and/or replicating the large volumes of changes in a distributed computing system (e.g., cloud-based system) for such large transactions can further result in inefficient use of storage resources and/or computing resources, respectively. In some cases, certain legacy approaches apply user limits to the number of objects in a given folder. Other legacy techniques implement other "throttling" techniques so as not to exceed certain database transaction capabilities (e.g., database server capabilities). However, such limits reduce the efficacy of the content management and/or collaboration benefits of the cloud-based platform. For example, in a large enterprise setting, the number of objects in any particular level of hierarchy (e.g., folder) can become far larger than any artificially imposed limits (e.g., "throttle limits").

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for performing large folder operations in a highly collaborative cloud-based environment, which techniques advance the relevant technologies to address technological issues with legacy approaches. Certain embodiments are directed to technological solutions for partitioning large folder operations into multiple database transactions that use cloud-based metadata to facilitate transaction execution and/or collaborator accessibility during the transactions, which embodiments advance the relevant technical fields as well as advancing peripheral technical fields.

The disclosed embodiments modify and improve over legacy approaches. In particular, the herein-disclosed techniques provide technical solutions that address the technical problems attendant to efficiently performing operations on folders having a large set of objects shared by a large number of collaborators while maximizing concurrent collaborator object accessibility. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A depicts a single transaction technique for performing large folder operations.

FIG. 1B presents a database transaction partitioning technique as implemented in systems for performing large folder operations in a highly collaborative cloud-based environment, according to some embodiments.

FIG. 1D1, FIG. 1D2, and FIG. 1D3 present schematic views of workspaces populated with dynamically-created content associated with large folder operations performed in a highly collaborative cloud-based environment, according to some embodiments.

FIG. 2 is a block diagram of a system for implementing techniques that perform large folder operations in a highly collaborative cloud-based environment, according to an embodiment.

FIG. 3 depicts an environment that supports computing components to carry out a protocol for performing large folder operations in a highly collaborative cloud-based environment, according to an embodiment.

FIG. 5B1, FIG. 5B2, FIG. 5B3, and FIG. 5B4 present permitted operation matrices that can be used to manage concurrent collaborator access when performing large folder operations in a highly collaborative cloud-based environment, according to an embodiment.

DETAILED DESCRIPTION

Figure 1C:
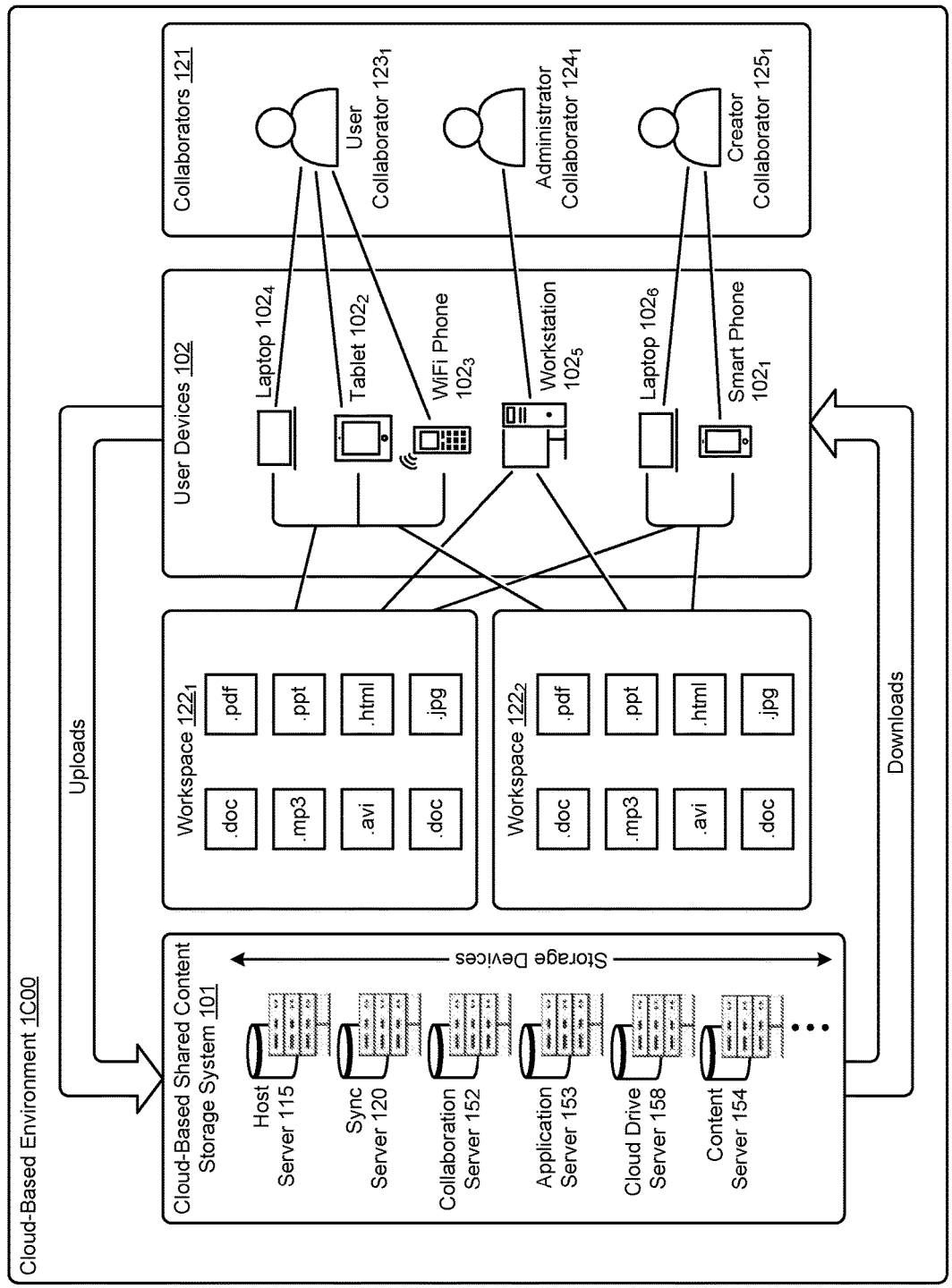
FIG. 1C presents a cloud-based environment including a collaborative cloud-based shared content management platform that facilitates efficiently performing large folder operations, according to an embodiment.

Some embodiments of the present disclosure address the problem of efficiently performing operations on folders having a large set of objects shared by a large number of collaborators while maximizing concurrent collaborator object accessibility and some embodiments are directed to approaches for partitioning large folder operations into multiple database transactions that use cloud-based metadata to facilitate transaction execution and/or collaborator accessibility during the transactions. More particularly, disclosed herein and in the accompanying figures are exemplary environments, systems, methods, and computer program products for performing large folder operations in a highly collaborative cloud-based environment.

Overview

Disclosed herein are techniques that partition large folder operations into multiple database transactions that use cloud-based metadata to facilitate transaction execution and/or collaborator accessibility during the transactions. The multiple database transactions each operate over respective subsets or portions (aka, "chunks") of the subject dataset associated with the large folder operation. In some embodiments, a search query is configured to select a next respective chunk for executing the large folder operation each time the search query is issued. In certain embodiments, metadata is used to manage logical locking of folders and/or objects for some operations (e.g., to be permissive about concurrent collaborator accesses). The metadata can further facilitate status reporting and/or error handling.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a single transaction technique 1A00 for performing large folder operations. As an option, one or more variations of single transaction technique 1A00 or any aspect thereof may be implemented in the context of the architecture and functionality of the embodiments described herein. The single transaction technique 1A00 or any aspect thereof may be implemented in any environment.

FIG. 1A depicts five representative content objects (e.g., folder A, folder B, folder C, folder G, and folder H) associated in various logical hierarchies in a logical folder view $160_1$. For example, folder A is the parent folder of two children folders (e.g., folder B and folder C), and folder G is the parent folder of one child folder (e.g., folder H). As shown in the logical folder view $160_1$, a set of content objects $164_1$ can be logically associated with folder B. Further, a set of users $162_1$ might have access to folder B and the associated set of content objects $164_1$ for sharing and/or collaborative purposes. In some cloud-based environments, such associations between content objects and logical folders and/or users (e.g., collaborators) might be described by information stored in a relational database. In some cases, for example, the users $162_1$ might be associated with an enterprise or an activity such that the number of items comprising the content objects $164_1$ and/or the number of users $162_1$ can become very large. In such cases, legacy techniques for performing operations (e.g., delete, move, copy, restore, etc.) on folder B might result in increasingly longer database transaction durations and, in some cases, database transaction failure.

Specifically, for example, moving folder B from folder A to folder G (e.g., see logical folder view $160_2$) might be performed in a single database transaction 166 according to some legacy techniques. In such cases, as the number of content objects $164_1$ increases, the latency of the single database transaction 166 also increases. For example, the single database transaction 166 might take multiple days to process. An operation lockout 168 on the content objects $164_1$ might also be enforced while the single database transaction 166 executes, resulting in users $162_1$ having no access to the content objects $164_1$ (e.g., for hours, days, etc.), which in turn decreases collaborator efficiency and satisfaction. Other issues associated with using the single database transaction 166 to perform such a large folder operation are possible, such as issues pertaining to lock contention, concurrent lock maintenance, lock wait timeouts, repeated and/or reattempted large folder operations, change tracking, distributed system change replication, and/or other issues.

The limitations of the single transaction technique 1A00 and other such techniques can be addressed by a database transaction partitioning technique as described in FIG. 1B, facilitated by the herein disclosed techniques for performing large folder operations in a highly collaborative cloud-based environment.

FIG. 1B presents a database transaction partitioning technique 1B00 as implemented in systems for performing large folder operations in a highly collaborative cloud-based environment. As an option, one or more variations of database transaction partitioning technique 1B00 or any aspect thereof may be implemented in the context of the architecture and functionality of the embodiments described herein. The database transaction partitioning technique 1B00 or any aspect thereof may be implemented in any environment.

The database transaction partitioning technique 1B00 illustrates one embodiment of the herein disclosed techniques for performing large folder operations in a highly collaborative cloud-based environment. Specifically, FIG. 1B depicts five representative content objects (e.g., folder A, folder B, folder C, folder G, and folder H) associated in various logical hierarchies in a logical folder view $160_3$. For example, folder A is the parent folder of two children folders (e.g., folder B and folder C), and folder G is the parent folder of one child folder (e.g., folder H). As shown, in the logical folder view $160_3$, a set of content objects $164_3$ can be logically associated with folder B. Further, a set of users $162_2$ might have access to folder B and the associated set of content objects $164_2$ for sharing and/or collaborative purposes. In some cloud-based environments, such associations between content objects and/or logical folders and/or users (e.g., collaborators) might be described by information stored in a relational database. When the number of items comprising the content objects $164_2$ and/or the number of users $162_2$ become large, performing operations (e.g., delete, move, copy, restore, etc.) on folder B might result in increasingly longer database transaction durations, exacerbating certain aspects of the problem The database transaction partitioning technique 1B00 and/or other techniques disclosed herein can address such problems attendant to efficiently performing operations on folders having a large set of objects shared by a large number of collaborators. Specifically, the database transaction partitioning technique 1B00 can address such scalability problems by processing large folder operations using a set of multiple database transactions 176. The multiple database transactions 176 break up the large folder operation into multiple "chunked" transactions that each operate on a "chunk" (e.g., subset of rows) of the relational database associated with the folder objects (e.g., content objects $164_2$). Certain embodiments use a search query with a returned item bound value (e.g., chunk size) on the number of items to return to select a subset of the content objects $164_2$. For example, an item might correspond to a database row associated with one instance of the content objects $164_2$. The invoked folder operation can then be applied to the selected subset of content objects $164_2$, updating the items in the relational databases associated with the selected subset of objects such that such items do not satisfy later issued instances of the search query. Using this technique, the total set of items satisfying the search query is reduced by the specified chunk size at each iteration of the search query. This process can be repeated until there are no items satisfying the search query, thus indicating the folder operation is complete as shown in a logical folder view $160_4$.

The database transaction partitioning technique 1B00 and/or other techniques disclosed herein can further address problems attendant to maximizing concurrent collaborator object accessibility during large folder operations. Specifically, an operation permissibility value 178 can enable various collaborators in users $162_2$ to access and/or perform certain operations on the content objects $164_2$ concurrent with the large folder operation executed using the multiple database transactions 176. For example, a user might be allowed to perform a certain set of operations on one or more of the content objects associated with some large folder operations, but might be locked out from other operations (e.g., to prevent operation conflicts) on one or more the content objects with other large folder operations.

In some embodiments, the operation permissibility can be responsive to the status of the multiple database transactions 176. For example, certain operations on a given chunk of items might be prohibited during execution of the database transaction associated with the chunk, but such operations might be allowed when the database transaction for the chunk is completed. Certain embodiments can further implement status tracking for the multiple database transactions 176 for various purposes, such as facilitating roll back and/or roll forward of operations when errors occur.

As earlier mentioned, the benefits of the database transaction partitioning technique 1B00 and/or other techniques disclosed herein can be most evident in a cloud-based shared content environment having large volumes of users, collaborators, and/or content objects (e.g., associated with a logical folder). One embodiment of a cloud-based environment is described as pertains to FIG. 1C.

FIG. 1C presents a cloud-based environment 1C00 including a collaborative cloud-based shared content management platform that facilitates efficiently performing large folder operations.

As shown, certain users (e.g., collaborators 121) having various collaboration roles (e.g., user collaborator $123_1$, administrator collaborator $124_1$, creator collaborator $125_1$, etc.) can use one or more instances of user devices 102 to interact with one or more workspaces (e.g., workspace $122_1$, workspace $122_2$, etc.) within the cloud-based environment 1C00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 120, a collaboration server 152, an application server 153, a cloud drive server 158, a content server 154, etc.

Any of the users can access shared content from the cloud-based shared content storage system 101 without the additional process of manually downloading and storing a file locally on an instance of the user devices 102 (e.g., smart phone $102_1$, tablet $102_2$, WiFi phone $102_3$, laptop $102_4$, workstation $102_5$, laptop $102_6$, etc.). For example, a content object (e.g., computer file, text document, audio file, video file, image file, etc.) created by the creator collaborator $125_1$ might be viewed by the user collaborator $123_1$ without informing the user collaborator $123_1$ where the file is stored or without prompting the user collaborator $123_1$ for a directory from which to access the file. Such a facility streamlines the frequently repeated sharing and collaboration processes.

Functions and techniques performed by the cloud-based shared content storage system 101 and/or the client side components (e.g., user devices 102, a collaboration client on an instance of the user devices 102, etc.) are described herein with further details and with reference to several examples. Further details pertaining to implementing the herein disclosed techniques in the cloud-based environment 1C00 are described in the following figures.

FIG. 1D1, FIG. 1D2, and FIG. 1D3 present schematic views of workspaces populated with dynamically-created content associated with large folder operations performed in a highly collaborative cloud-based environment. As an option, one or more variations of the views or any aspect thereof may be implemented in the context of the architecture and functionality of the embodiments described herein. The views or any aspect thereof may be implemented in any environment.

The embodiment shown in FIG. 1D1 is merely one example implementation of the herein disclosed techniques in a cloud-based environment where one collaborator (e.g., the user collaborator $123_1$) can invoke large folder operations and, concurrently, another collaborator (e.g., user collaborator $123_2$) can access and/or invoke permissible operations over the content objects that are contained in the large folder. In some cases, two or more collaborators might be presented with differing views that include (or do not include) certain characteristics.

The embodiment shown in FIG. 1D1 depicts operations associated with moving a large folder from one parent in a location (e.g., a source location) to another location (e.g., a target location). As shown, a first user $123_1$ might have the capability (e.g., permissions) to issue a move operation on a folder having a large set of content objects. This is shown in view 1D100 that depicts folder "B" being shared by other collaborators. Strictly as one example, the user collaborator $123_1$ might be able to view folder "B" as well as certain other logical folders (see workspace $122_1$). Suppose the user collaborator $123_1$ wants to manipulate (e.g., move) folder "B" from parent "A" to parent "G" (as shown). The user collaborator $123_1$ might invoke such an operation on folder "B" using the herein disclosed techniques. Concurrently, user collaborator $123_2$ might want to view the same or adjacent folders in a larger hierarchy, which same or adjacent folders might include folder "B" for which both user collaborator $123_1$ and also user collaborator $123_2$ have permission to view. Concurrently, user collaborator $123_2$ might be able to view the same or adjacent folders in a larger hierarchy, which same or adjacent folders might include folder "X" for which only user collaborator $123_2$ has permission to view. As shown in workspace $122_2$ and, more specifically, during the performance of activities pertaining to the aforementioned move operation (e.g., as initiated by user collaborator $123_1$), user collaborator $123_2$ sees a view that is consistent with the hierarchy just before the performance of activities pertaining to the depicted move operation.

Figure 2:
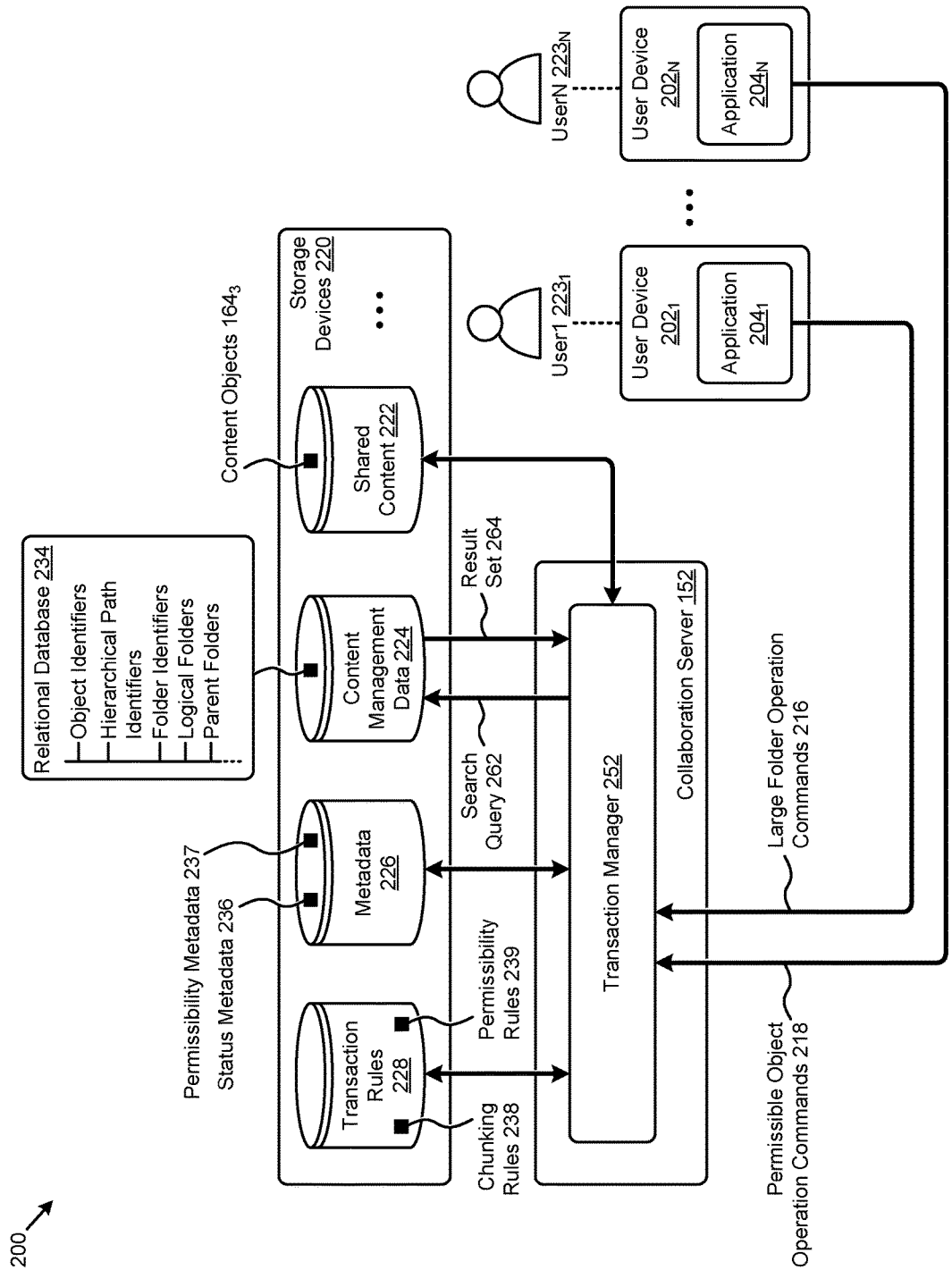

Referring now to view 1D200 of FIG. 1D2, user collaborator $123_2$ may choose to initiate operations during timeframes that overlap the performance of activities pertaining to the aforementioned move operation. More particularly, the user collaborator $123_2$ can initiate operations associated with objects that are in a hierarchy path that includes the to-be-moved folder (e.g., folder "B"). The specific operations that can be initiated, and then permitted or denied, can be processed in accordance with dependencies pertaining to the nature of the operation (e.g., move, copy, delete, restore, etc.), dependencies pertaining to the location of the respective folder in a hierarchy (e.g., in a descendant folder or in an ancestor folder), and/or dependencies pertaining to whether or not the operation is to be applied to an object in a source folder location or a target folder location. As shown in this embodiment, the user collaborators (e.g., user collaborators who did not initiate the move operation) can only see the source folder at the source folder location, whereas the user collaborator (e.g., user collaborator who did initiate the move operation) can see a representation of the source folder at the source folder location as well as a representation of the to-be-moved folder at the target folder location, as shown.

Figure 3:
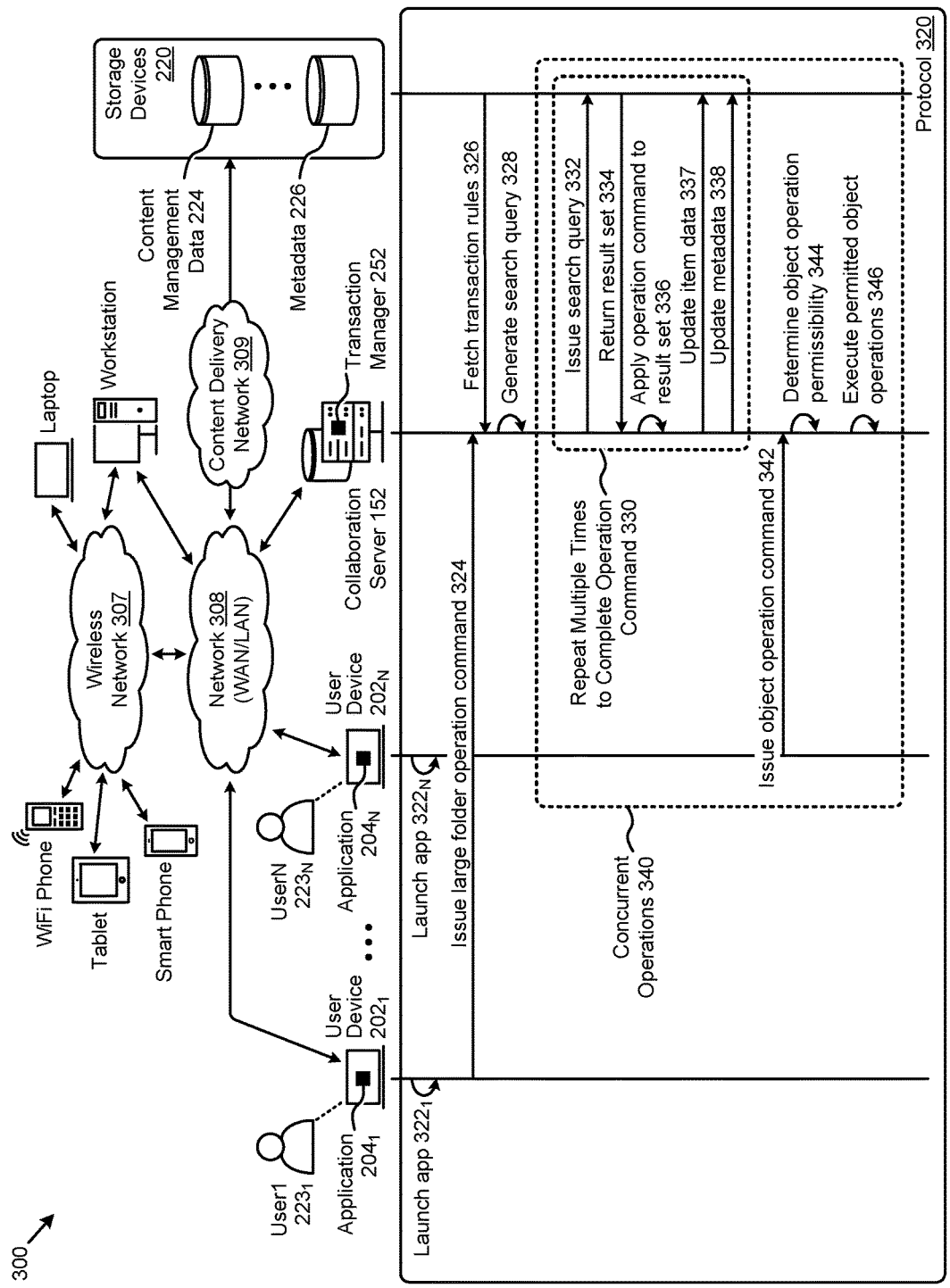

Referring to view 1D300 of FIG. 1D3, when the large folder operation is complete, all collaborating users who have permission to view the subject folder can see the subject folder in their respective workspace (e.g., see target location). The workspace can be constructed to include only folders and/or objects for which a particular collaborator has permission to view. Accordingly, the workspace view as seen by some other collaborator may differ from the view depicted within the shown workspaces. Management of workspace views, in particular management of workspace views that are in accordance with sets of user permissions, can be implemented in accordance with embodiments such as are depicted in FIG. 2.

FIG. 2 is a block diagram 200 of a subsystem for implementing techniques that perform large folder operations in a highly collaborative cloud-based environment. As an option, one or more variations of block diagram 200 or any aspect thereof may be implemented in the context of the architecture and functionality of the embodiments described herein. The components shown in block diagram 200 or any aspect thereof may be implemented in any environment.

The shown subsystem depicts multiple users (e.g., user1 $223_1, \ldots$, userN $223_N$) managing shared content using the herein disclosed techniques for performing large folder operations in a highly collaborative cloud-based environment. For example, the shared content might comprise the content objects $164_3$ from a set of shared content 222 stored in a set of storage devices 220. As further shown, the shared content 222 can be represented by a set of content management data 224. Specifically, the content management data 224 can comprise one or more instances of a relational database 234 comprising information to facilitate efficient access to and/or management of the content objects $164_3$ in a cloud-based environment (e.g., distributed computing and/or storage environment). For example, the schema for the relational database 234 might include data table columns associated with object identifiers, hierarchical path identifiers, logical folder identifiers, ancestor folder identifiers, descendant folder identifiers, and/or other attributes. Data (e.g., cell values from any row and column) from any data tables in the relational database 234 might be used to determine what transactions or operations can or cannot be deemed to be allowable while a large folder operation is in process (e.g., see FIG. 5B1, FIG. 5B2, FIG. 5B3, and FIG. 5B4).

In one or more embodiments, the herein disclosed techniques can be facilitated by a transaction manager 252 operating on the collaboration server 152. Specifically, the transaction manager 252 might receive one or more instances of large folder operation commands 216 from an application $204_1$ operating on a user device $202_1$ associated with user1 $223_1$. The transaction manager 252 can process the large folder operation commands 216 using sets of multiple database transactions to operate on the relational database 234. Specifically, the transaction manager 252 can determine a search query 262 to select a subset (e.g., chunk) of items from the relational database 234 each time the search query 262 is issued, returning a respective instance of a result set 264 corresponding to the subset of items. In some cases, the search query 262 can have a returned item bound value to determine the chunk size. For example, the returned item bound might be derived from a set of chunking rules 238 from a set of transaction rules 228. The invoked instance of the large folder operation commands 216 can then be applied to the result set 264. The items associated with the result set 264 can be updated such that items associated with previous result sets do not satisfy later issued instances of the search query 262. For example, the hierarchical path identifier for a given item (e.g., content object) might be updated such that the item is not selected by the search query 262. The search query 262 can continue to be issued on the relational database 234 until all chunks have been processed to complete the invoked instance of the large folder operation commands 216.

The subsystem shown in FIG. 2 can provide other shared content management capabilities using the herein disclosed techniques for performing large folder operations in a highly collaborative cloud-based environment. Specifically, the transaction manager 252 can process various instances of permissible object operation commands 218 from an application $204_N$ operating on a user device $202_N$ associated with userN $223_N$. The transaction manager 252 can receive the permissible object operation commands 218 to determine the instances, if any, of such commands that can be executed concurrent with certain large folder operations (e.g., corresponding to the large folder operation commands 216). Specifically, in one or more embodiments, the transaction manager 252 might use a set of permissibility rules 239 from the transaction rules 228 to determine a first set of operations permitted for execution on one or more of the content objects associated with the large folder operations and/or determine a second set of operations prohibited during the large folder operations. The herein disclosed techniques can enhance permissibility of the users during large folder operations, in part, by tracking the content object status and/or permissibility at a more granular chunk and/or database item level.

For example, in some embodiments, a set of permissibility metadata 237 stored in a metadata store (e.g., metadata 226) can be updated dynamically in response to the execution of the chunked database transactions comprising the large folder operations. The permissibility metadata 237 might then be used, in part, to determine certain permissibility attributes (e.g., allowed operations) associated with each item. Further, a set of status metadata 236 can be used for status tracking to facilitate error handling. For example, the status metadata 236 might be used to invoke a roll back of a failed chunk operation and/or the full folder operation, or to invoke a roll forward (e.g., retry) of a failed chunk operation.

The subsystem depicted by block diagram 200 in FIG. 2 presents merely one partitioning. The specific example shown is purely exemplary, and other partitioning is reasonable. One embodiment of an environment and protocol supporting such systems, subsystems, and/or partitionings for performing large folder operations in a highly collaborative cloud-based environment is shown in FIG. 3.

FIG. 3 depicts an environment 300 that supports computing components to carry out a protocol for performing large folder operations in a highly collaborative cloud-based environment.

As shown in FIG. 3, the environment 300 comprises various computing systems (e.g., servers and devices) interconnected by a wireless network 307, a network 308, and a content delivery network 309. The wireless network 307, the network 308, and the content delivery network 309 can comprise any combination of a wide area network (e.g., WAN), local area network (e.g., LAN), cellular network, wireless LAN (e.g., WLAN), or any such means for enabling communication of computing systems. The wireless network 307, the network 308, and the content delivery network 309 can also collectively be referred to as the Internet. The content delivery network 309 can comprise any combination of a public network and a private network. More specifically, environment 300 can comprise at least one instance of the collaboration server 152 and at least one instance of the storage devices 220. The servers and storage devices shown in environment 300 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152 and the storage devices 220 can comprise a cloud-based content management platform that provides shared content management and storage services.

The environment 300 further comprises instances of user devices (e.g., user device $202_1, \ldots$, user device $202_N$) that can represent one of a variety of other computing devices (e.g., a smart phone, a tablet, a WiFi phone, a laptop, a workstation, etc.) having software (e.g., application $204_1$, . . . , application $204_N$, respectively) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 307, the network 308, and the content delivery network 309. As shown, the user device $202_1$ can be operated by the user1 $223_1$ and the user device $202_N$ can be operated by the userN $223_N$. Also, an instance of the transaction manager 252 can operate on the collaboration server 152, and the storage devices 220 can comprise the content management data 224 and the metadata 226 to, in part, facilitate the herein disclosed techniques.

As shown, the user device $202_1$, the user device $202_N$, the collaboration server 152, and the storage devices 220 can exhibit a set of high order interactions (e.g., operations, messages, etc.) in a protocol 320. Specifically, and as shown, the application $204_1$ can be launched at the user device $202_1$ (see operation $322_1$) and the application $204_N$ can be launched at the user device $202_N$ (see operation $322_N$). Such applications, for example, might be instances of a web application provided by the cloud-based content management platform to facilitate use of the herein disclosed techniques. For example, user1 $223_1$ might use the application $204_1$ to issue a large folder operation command to be received by the collaboration server 152 (see message 324). The collaboration server 152 can fetch a set of transaction rules for determining how to process the received large folder operation command (see message 326). Specifically, according to the herein disclosed techniques, the transaction rules might be used to generate a search query to operate on a relational database in the content management data 224 to facilitate partitioning the large folder operation into multiple chunked database transactions (see operation 328).

The search query can then be issued to the content management data 224 (see message 332) to return a result set (see message 334). For example, the result set might comprise a subset of total items from the content management data 224 satisfying the search query, where the size of the subset is determined by a returned item bound (e.g., a chunk size specified in the transaction rules). The received operation command can then be applied to the result set (see operation 336). Certain item data might then be updated responsive to applying the operation command to the result set (see message 337). For example, certain path identifiers associated with one or more items might be updated in a relational database table in content management data 224. In some cases, certain metadata can also be updated responsive to applying the operation command to the result set (see message 338). For example, certain status metadata and/or permissibility metadata for one or more items in the result set might be dynamically updated in metadata 226. As shown in a grouping 330, a certain set of the foregoing operations and/or messages can be repeated to complete the received large folder operation command.

As further shown in protocol 320, a set of concurrent operations 340 can be facilitated by the herein disclosed techniques. Specifically, the userN $223_N$ can issue an object operation command from the user device $202_N$ to be received by the collaboration server 152 (see message 342). In some cases, such object commands can pertain to content objects associated with the large folder operation command issued by user1 $223_1$ (see message 324). In such cases, the collaboration server 152 can determine the permissibility of the received object operation (see operation 344). For example, for a file having a given parent folder, a file copy operation might be allowed during a parent folder move operation, while a file delete operation might be prohibited during a parent folder copy operation. In some cases, the permissibility of an object operation can be based in part on certain status metadata, permissibility metadata, permissibility rules, and/or other information. Any permitted object operations can then be executed concurrently with the large folder operation (see operation 346). In some cases, such object operations can be executed synchronously or asynchronously to the database transactions associated with the large folder operation.

Further details pertaining to the various techniques implemented in protocol 320 and disclosed herein are described in the following.

Figure 4:
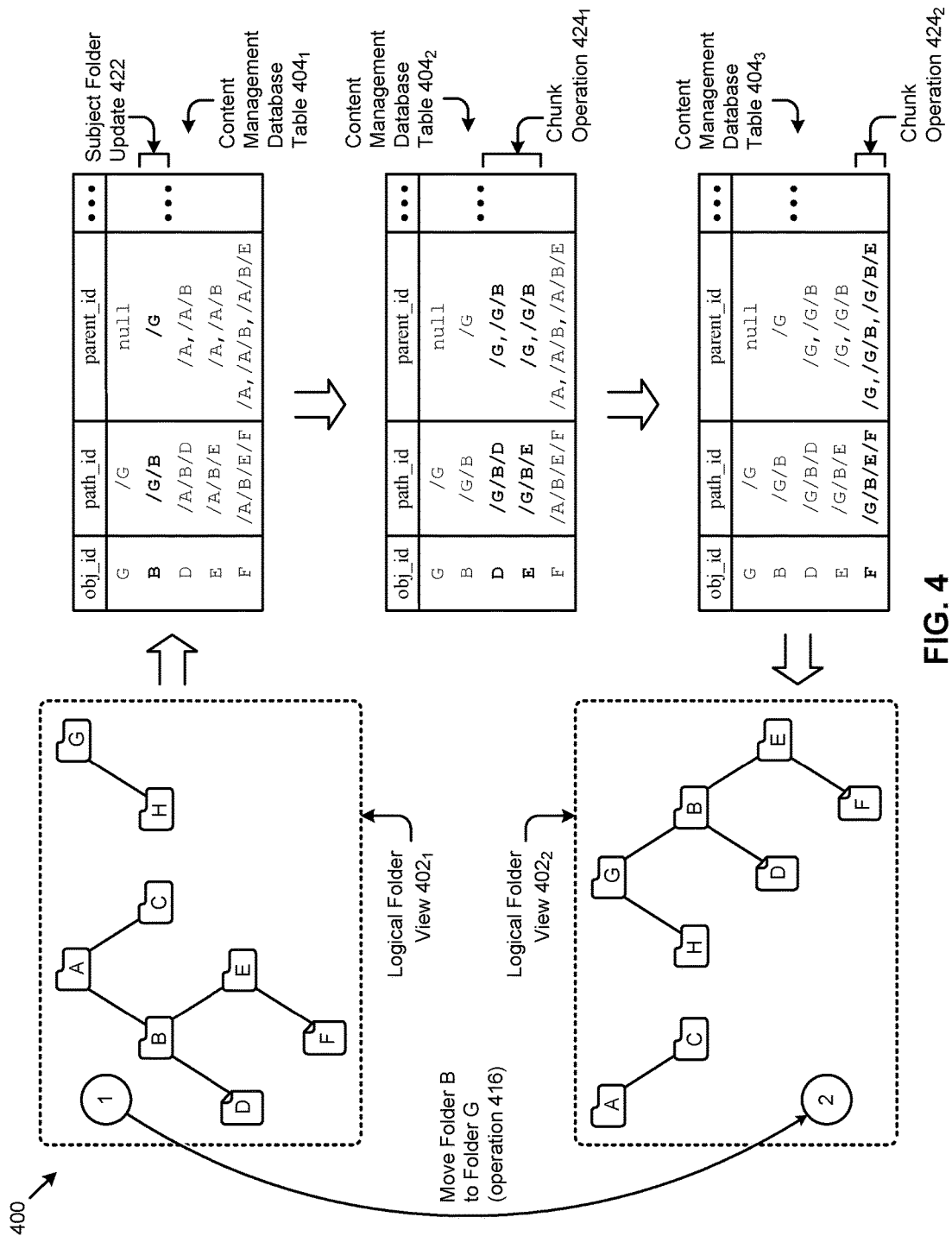
FIG. 4 illustrates an operation chunking technique as implemented in systems for performing large folder operations in a highly collaborative cloud-based environment, according to an embodiment.

FIG. 4 illustrates an operation chunking technique 400 as implemented in systems for performing large folder operations in a highly collaborative cloud-based environment. As an option, one or more variations of operation chunking technique 400 or any aspect thereof may be implemented in the context of the architecture and functionality of the embodiments described herein. The operation chunking technique 400 or any aspect thereof may be implemented in any environment.

As shown in FIG. 4, a logical folder view $402_1$ depicts six content objects (e.g., folder A, folder B, folder C, folder E, document D, and document F) associated in a first logical hierarchy, and two content objects (e.g., folder G and folder H) associated in a second logical hierarchy. The operation chunking technique 400 can be illustrated in a representative large folder operation comprising a move of folder B to folder G (see operation 416) to produce the logical folder view $402_2$. In some cases (e.g., in a cloud-based shared content management environment), the foregoing objects can be characterized in a relational database table to facilitate access to and/or management of the content objects. In such cases, the herein techniques can be implemented as described by the operation chunking technique 400, according to certain embodiments.

Specifically, a content management database table $404_1$ can comprise rows associated with the foregoing content objects having columns comprising certain attributes of each content object. For example, as shown, document D might have an object identifier or obj_id=D, a hierarchical path identifier or path_id=/A/B/D, a parent folder identifier or parent_id=/A, /A/B, and/or other attributes. As shown in the content management database table $404_1$, the move of folder B to folder G might invoke a subject folder update 422 of the database row associated with folder B. In some cases, the subject folder update 422 might occur before any chunked portion of the large folder operation is invoked. With a specified chunk size of 2, a search query containing a WHERE path_id LIKE '/A/B %' clause with a default ascending sort order on the path_id field would return the rows associated with document D and folder E in a first result set. Applying the large folder operation (e.g., move folder B to folder G) to this first result set precipitates the highlighted row updates associated with a chunk operation $424_1$. When the foregoing search query is reissued on the then current instance of the content management database table $404_2$ to select the next chunk from the database, document D and folder E would no longer satisfy the search query, but document F would satisfy the search query to comprise a second result set. Applying the large folder operation to this second result set precipitates the highlighted item updates associated with a chunk operation $424_2$.

The next time the search query is issued on the then current instance of the content management database table $404_3$, no items (e.g., rows) are returned, signaling the completion of the large folder operation.

As shown, the operation chunking technique 400 does not require maintaining an index and/or marker offset to issue with each subsequent search query to distinguish between items that have been processed and items that have not been processed. Rather, the operation chunking technique 400 operates such that all processed items become excluded from subsequent search query result sets. Further, the search query does not need to impose a specific sort order, simplifying the structure of the search query. Also, the search query can operate on a denormalized path_id field, facilitating issuance of a single search query to capture the entire hierarchical subtree of the subject folder, including the content objects within the subtree, such that a given content object can be updated independently of the other content objects.

Logical locking of certain content object operations during the execution of large folder operations can also be implemented using the herein disclosed techniques. One embodiment of such logical locking techniques is discussed as pertains to FIG. 5A using the foregoing representative large folder operation (see operation 416).

Figure 5A:
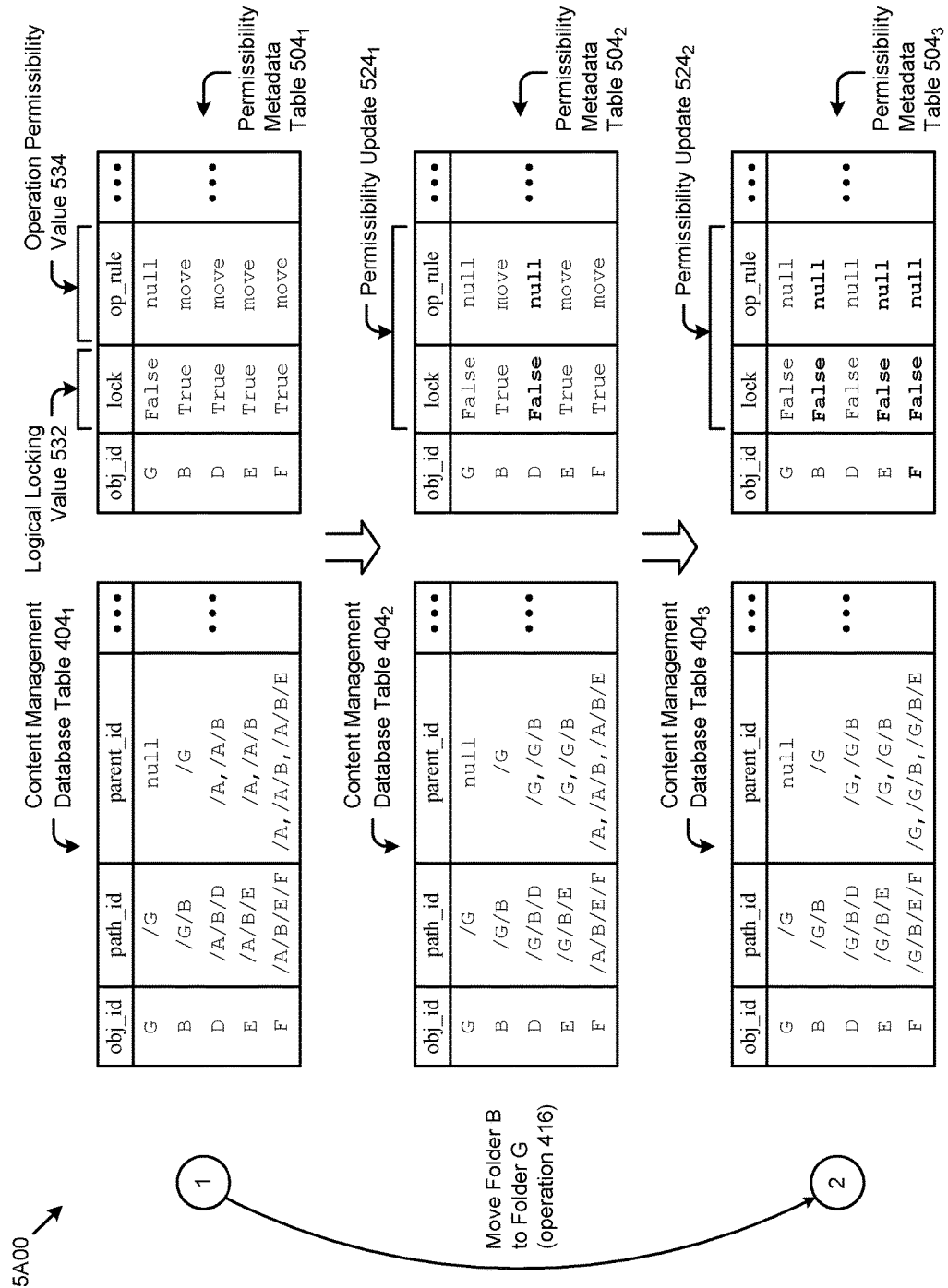
FIG. 5A depicts a logical locking technique as implemented in systems for performing large folder operations in a highly collaborative cloud-based environment, according to an embodiment.

FIG. 5A depicts a logical locking technique 5A00 as implemented in systems for performing large folder operations in a highly collaborative cloud-based environment. As an option, one or more variations of logical locking technique 5A00 or any aspect thereof may be implemented in the context of the architecture and functionality of the embodiments described herein. The logical locking technique 5A00 or any aspect thereof may be implemented in any environment.

As shown in FIG. 5A, the logical locking technique 5A00 can be illustrated in the representative large folder operation comprising a move of folder B to folder G (see operation 416) as earlier described in FIG. 4. Specifically, a sequence of permissibility metadata updates corresponding to the earlier described sequence of content management data updates (e.g., content management database table $404_1$, content management database table $404_2$, and content management database table $404_3$) associated with the move of folder B to folder G is shown. In certain embodiments, the permissibility metadata can be used to implement the logical locking technique 5A00 for maximizing concurrent collaborator object accessibility while efficiently performing large folder operations in a highly collaborative cloud-based environment. More specifically, the permissibility metadata can be structured in a permissibility metadata table $504_1$ that comprises rows associated with the content objects associated with the large folder operation (e.g., folder B, folder E, document D, document F, and folder G) having columns comprising certain permissibility attributes for each content object. In some cases, the permissibility attributes might characterize a logical locking value 532, an operation permissibility value 534, and/or other attributes. For example, as shown, folder G might have a lock=False (e.g., no lock), an operation rule or op_rule=null (e.g., not specified), and/or other attributes. As another example, document D might have a lock=True (e.g., locking enabled), an op_rule=move (e.g., apply rules associated with a "move" large folder operation), and/or other attributes.

As shown, the completion of the first chunk operation associated with the large folder operation (e.g., see the content management database table $404_2$) can precipitate a permissibility update $524_1$ associated with an instance of the permissibility metadata table $504_2$. For example, in some situations, a logical lock for a document can be disabled after all transactions associated with the document have been completed. As another example, even after the folder E move has been completed according to the content management database table $404_2$, the logical lock on folder E might remain enabled since one or more descendants of folder E (e.g., file F) might not yet have been moved. At the completion of the second chunk operation associated with the large folder operation (e.g., see the content management database table $404_3$), a permissibility update $524_2$ associated with an instance of the permissibility metadata table $504_3$ can occur. Specifically, the logical lock for all items associated with the large folder operation can be disabled since all transactions associated with the large folder operation have been completed.

In some embodiments, to further reduce the latency associated with updating such permissibility metadata, a single logical lock for a certain folder at the top of the folder subtree associated with the large folder operation might be implemented. For example, a logical lock on the subject folder and/or the parent folder of the subject folder associated with the large folder operation can be implemented. Such logical locks can prevent conflicting updates to subfolders and/or parent folders of the subject folder from occurring. In such embodiments, the permissibility metadata table might comprise a path identifier or path_id column to indicate the path of the locked folder, an include descendants column to indicate whether to lock the descendants of the locked folder, and/or other columns characterizing other attributes.

As shown in the logical locking technique 5A00, certain embodiments of the herein disclosed techniques can use permissibility metadata having an operation permissibility attribute (e.g., operation permissibility value 534) describing the subject large folder operation so as to determine permissible concurrent object operations. Certain embodiments depicting example mappings of large folder operations to be permitted, denied, or restricted are shown in the following figures.

FIG. 5B1, FIG. 5B2, FIG. 5B3, and FIG. 5B4 present permitted operation matrices that can be used to manage concurrent collaborator access when performing large folder operations in a highly collaborative cloud-based environment. As an option, one or more variations of permitted operation matrices or any aspect thereof may be implemented in the context of the architecture and functionality of the embodiments described herein. The permitted operation matrices or any aspect thereof may be implemented in any environment.

The permitted operation matrices are merely example mappings of certain types of large folder operations 552 (e.g., move, copy, delete, restore, etc.) to respective instances of concurrent object-level or large folder operations that are requested to be performed over objects that are in the same hierarchy as the requested large folder operations. The permitted operation matrices can be used by the herein disclosed techniques for determining collaborator operations permitted during large folder operations. For example, a concurrent "copy" operation on any of the content objects associated with a large folder "delete" operation might be permitted (e.g., see "Yes" indicator in some of the permitted operation matrices), while all other concurrent object operations might be prohibited (e.g., see "No" indicator in some of the permitted operation matrices). As another example, a concurrent "copy" operation on any of the content objects associated with a large folder "move"

operation might be permitted (e.g., see "Yes" indicator in matrix), or a concurrent "move" operation on any of the siblings of the subject folder of the large folder "move" operation might be permitted only under certain conditions. The shown permitted operation matrices together with their matrix column and row indicators and/or other attributes are merely examples—variations in other embodiments are possible.

The following conventions apply to the discussions infra:
Source folder descendants refers to the child elements (if any) of the source folder being operated on;
Source folder ancestors refers to the parent folders (if any) of the source folder being operated on;
Target folder descendants refers to the child elements (if any) of the target folder being operated on;
Target folder ancestors refers to the parent folders (if any) of the target folder being operated on.

As depicted in FIG. 5B1, the source descendant permission matrix 5B100 includes permission indications for performing concurrent operations on objects that are source folder descendants (see columns 554) while the large folder operations 552 are in progress. As one example, while a copy operation on a large folder is in progress, it is permitted for another concurrent copy operation to be initiated over an object such as a descendant folder or object of the source folder.

As depicted in FIG. 5B2, the source ancestor permission matrix 5B200 includes permission indications for performing concurrent operations on objects that are source folder ancestors (see columns 555) while the large folder operations 552 are in progress. As one example, while a copy operation on a large folder is in progress, it is permitted for another concurrent copy operation to be initiated over an object such as an ancestor folder of the source folder.

As depicted in FIG. 5B3, the target descendant permission matrix 5B300 includes permission indications for performing concurrent operations on objects that are target folder descendants (see columns 556) while the large folder operations 552 are in progress. As one example, while a move operation on a large folder is in progress, it is permitted for another concurrent move operation to be initiated over an object such as a descendant folder or object of the target folder.

As depicted in FIG. 5B4, the target ancestor permission matrix 5B400 includes permission indications for performing concurrent operations on objects that are target folder ancestors (see columns 557) while the large folder operations 552 are in progress. As one example, while a copy operation on a large folder is in progress, it is permitted for another concurrent copy operation to be initiated over an object such as an ancestor folder of the target folder.

Status tracking and/or error handling during the execution of large folder operations can also be implemented using the herein disclosed techniques. One embodiment of such techniques is described in FIG. 6 using the representative large folder operation described in FIG. 4.

Figure 6:
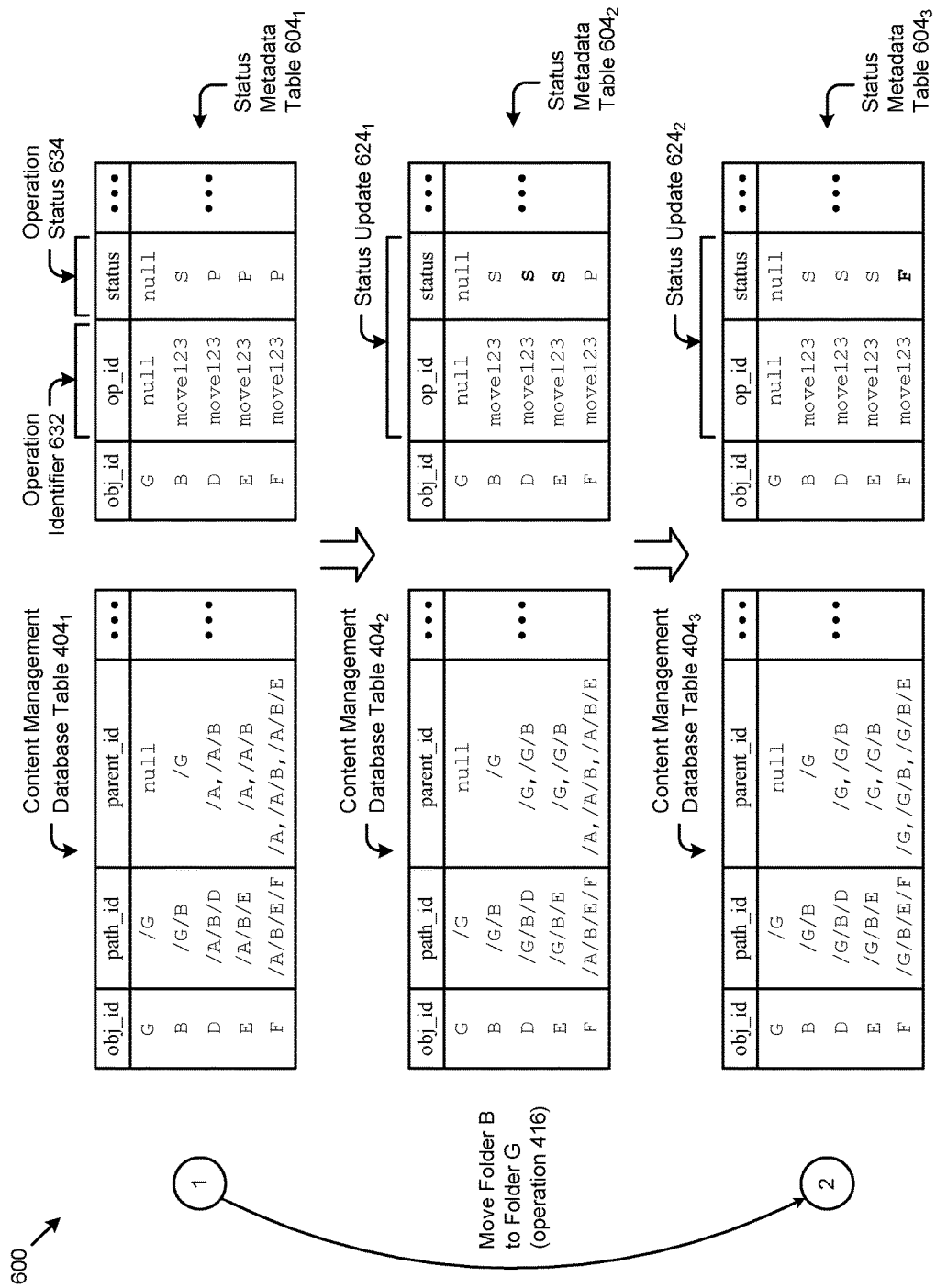
FIG. 6 presents an error handling technique as implemented in systems for performing large folder operations in a highly collaborative cloud-based environment, according to an embodiment.

FIG. 6 presents an error handling technique 600 as implemented in systems for performing large folder operations in a highly collaborative cloud-based environment. As an option, one or more variations of error handling technique 600 or any aspect thereof may be implemented in the context of the architecture and functionality of the embodiments described herein. The error handling technique 600 or any aspect thereof may be implemented in any environment.

According to the herein disclosed techniques, large folder operations are partitioned into multiple chunk operations corresponding to a respective database transaction. In some cases, when an error (e.g., data connection error, data connection outage, data corruption, etc.) occurs, all processed chunk operations (e.g., updated database rows) can be rolled back a state prior to processing the chunk operations. A method for identifying and/or querying the subset of items having been processed might be needed to facilitate a roll back technique. In other cases, when an error occurs, all unprocessed chunk operations can be rolled forward (e.g., processed, reattempted, etc.) to complete the large folder operation. The search queries associated with the earlier described operation chunking technique (see FIG. 4) can serve to determine the unprocessed chunk operations to facilitate a roll forward technique. In such cases, a limit on the number of re-attempts of any chunk operations can be implemented to prevent infinite looping. As described herein, the error handling technique 600 can be used to support a roll forward technique, and/or other techniques.

Specifically, as shown in FIG. 6, the error handling technique 600 can be illustrated in the representative large folder operation comprising a move of folder B to folder G (see operation 416) as earlier described in FIG. 4. More specifically, a sequence of status metadata updates corresponding to the earlier described sequence of content management data updates (e.g., content management database table $404_1$, content management database table $404_2$, and content management database table $404_3$) associated with the move of folder B to folder G is shown. The status metadata can be structured in a status metadata table $604_1$ that comprises rows associated with the content objects associated with the large folder operation (e.g., folder B, folder E, document D, document F, and folder G) having columns comprising certain status attributes for each content object. In some cases, the status attributes might characterize an operation identifier 632, an operation status 634, and/or other attributes. For example, as shown, folder B might have an op_id=move123, a status=s (e.g., "Successfully completed status"), and/or other attributes, while the descendants of folder B (e.g., folder E, document D, and document F) might have an op_id=move123, a status=P (e.g., "Pending completion status"), and/or other attributes.

The completion of the first chunk operation associated with the large folder operation (e.g., see the content management database table $404_2$) can precipitate a status update $624_1$ associated with an instance of the status metadata table $604_2$. Specifically, the status of document D and folder E can be updated to indicate a successfully completed associated chunk operation. At some moment in time prior to the successful completion of the second chunk operation associated with the large folder operation (e.g., see the content management database table $404_3$), a status update $624_2$ associated with an instance of the status metadata table $604_3$ can occur. Specifically, the status of document F might indicate a failed chunk operation (e.g., status=F or failed status). In this case, the path_id and parent_id associated with document F would remain as shown in the content management database table $404_2$. The status of document F from the status metadata table $604_3$ can then be used to re-attempt (e.g., roll forward) the chunk operation comprising document F according to the herein disclosed techniques. If a re-attempt completes successfully, the path_id and parent_id of document F will be updated as shown the content management database table $404_3$. Alternatively, when the failed transaction in the status metadata table $604_3$ is detected, a roll back of the large folder operation could be achieved with a revert query containing the WHERE path_id LIKE '/G/B %' clause. Such a revert query can be iteratively issued (e.g., with a chunk size of 2) until the large folder operation is rolled back to a state corresponding to the content management database table 404₁.

Additional Embodiments of the Disclosure

Additional Practical Application Examples

Figure 7A:
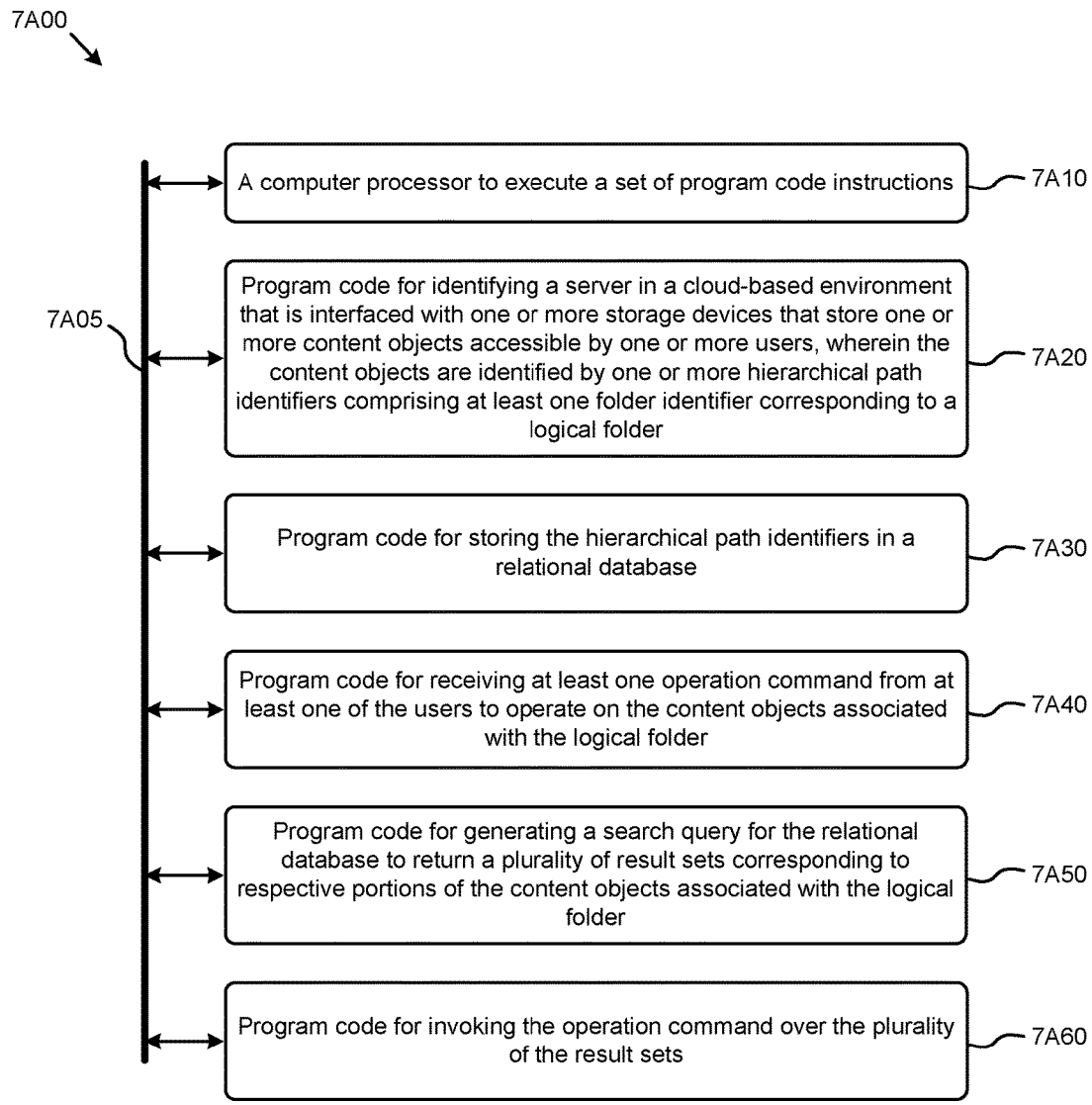
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for accessing memory to hold program code instructions to perform: identifying a server in a cloud-based environment that is interfaced with one or more storage devices that store one or more content objects accessible by one or more users, wherein the content objects are identified by one or more hierarchical path identifiers comprising at least one folder identifier corresponding to a logical folder (see module 7A20); storing the hierarchical path identifiers in a relational database (see module 7A30); receiving at least one operation command from at least one of the users to operate on the content objects associated with the logical folder (see module 7A40); generating a search query for the relational database to return a plurality of result sets corresponding to respective portions of the content objects associated with the logical folder (see module 7A50); and invoking the operation command over the plurality of the result sets (see module 7A60).

Strictly as examples, the system 7A00 may be modified such that:
  The system 7A00 further comprises updating status metadata to indicate an operation status for the respective portion of the content objects associated with the logical folder.
  The system 7A00 further comprises repeatedly invoking the operation command on at least a portion of the result sets based at least in part on the operation status.
  The system 7A00 further comprises generating a revert query for the relational database based at least in part on the operation status.
  The system 7A00 uses an operation status that characterizes at least one of, a successfully completed status, a pending completion status, a queued status, or a failed status.
  The system 7A00 further comprises updating permissibility metadata to indicate an operation permissibility for the respective portion of the content objects associated with the logical folder.
  The system 7A00 derives operation permissibility from the operation command.

Variations of the foregoing may include more or fewer of the foregoing modules and variations may perform more or fewer (or different) steps, and may use data elements in more or fewer (or different) operations.

Figure 7B:
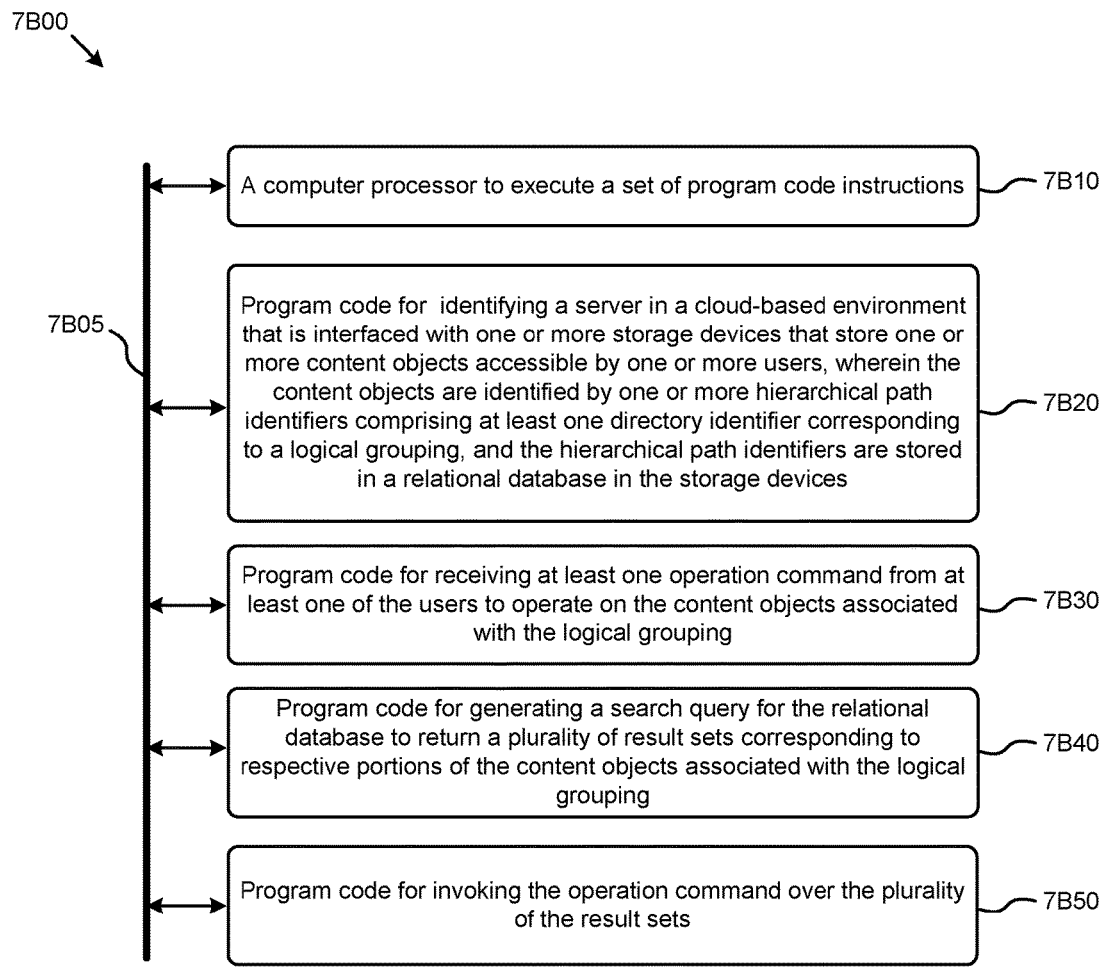

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising a computer processor to execute a set of program code instructions (see module 7B10) and modules for accessing memory to hold program code instructions to perform: identifying a server in a cloud-based environment that is interfaced with one or more storage devices that store one or more content objects accessible by one or more users, wherein the content objects are identified by one or more hierarchical path identifiers comprising at least one directory identifier corresponding to a logical grouping, and the hierarchical path identifiers are stored in a relational database in the storage devices (see module 7B20); receiving at least one operation command from at least one of the users to operate on the content objects associated with the logical grouping (see module 7B30); generating a search query for the relational database to return a plurality of result sets corresponding to respective portions of the content objects associated with the logical grouping (see module 7B40); and invoking the operation command over the plurality of the result sets (see module 7B50).

System Architecture Overview

Additional System Architecture Examples

Figure 8A:
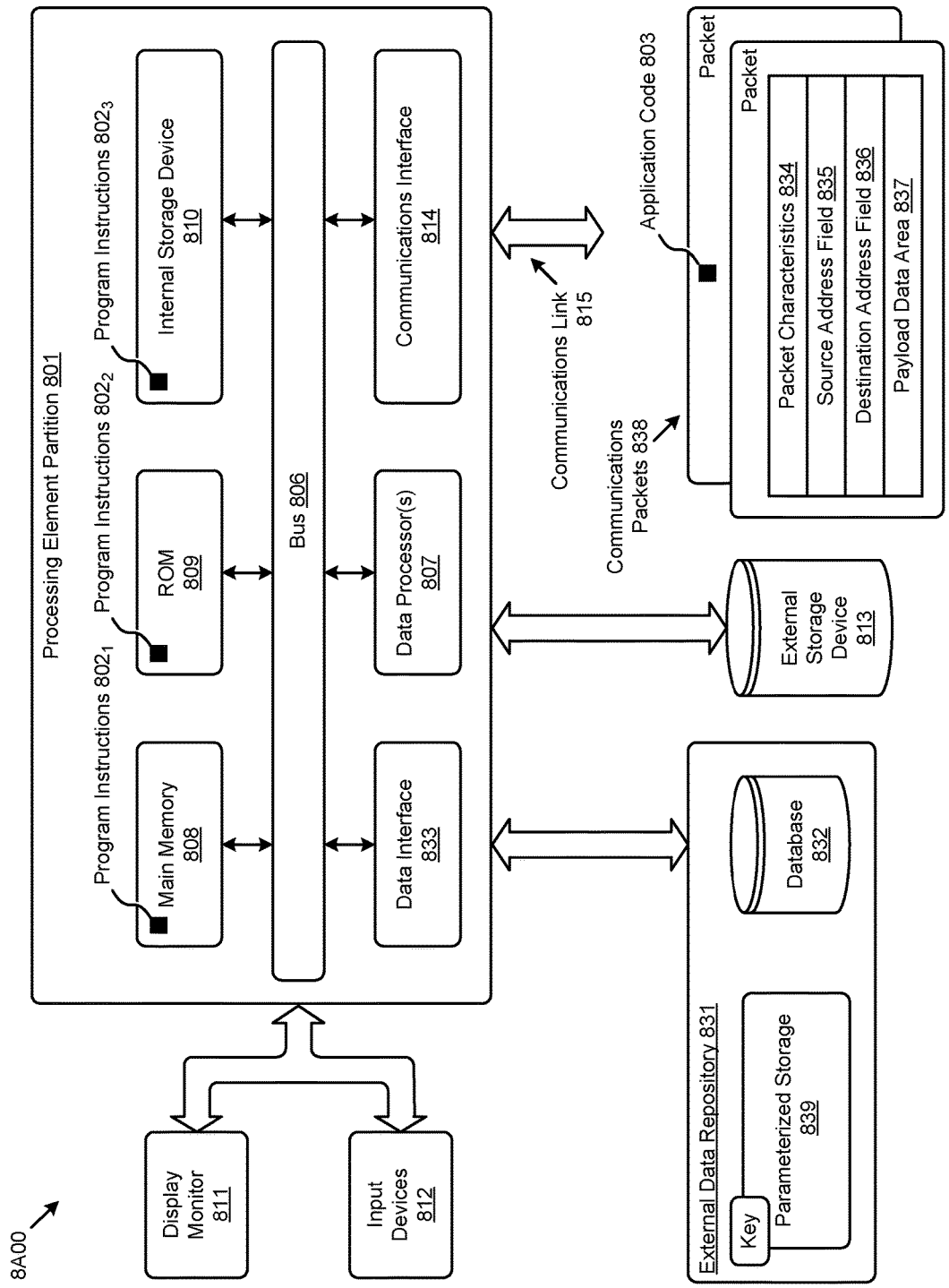
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device and/or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/ or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics of performing large folder operations in a highly collaborative cloud-based environment.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing large folder operations in a highly collaborative cloud-based environment). Such files or records can be brought into and/or stored in volatile or non-volatile memory.

Figure 8B:
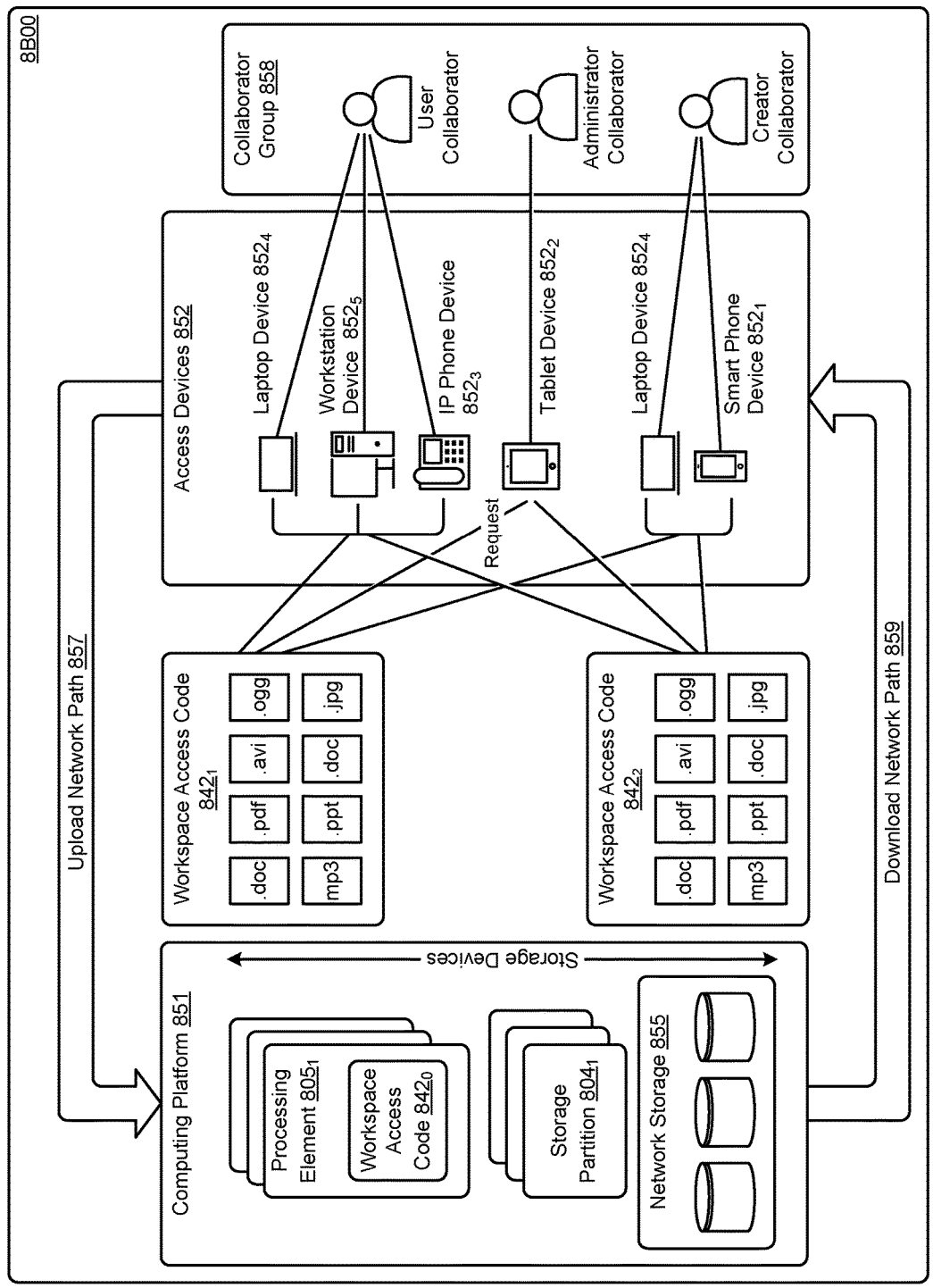

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of the shown access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such the shown networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., via a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    identifying a server in a cloud-based environment that is interfaced with one or more storage devices that store one or more content objects accessible by one or more users, wherein the content objects are identified by one or more hierarchical path identifiers comprising at least one folder identifier corresponding to a logical folder, and wherein the hierarchical path identifiers are stored in a relational database in the storage devices;
    receiving an operation command from at least one of the users to operate on the content objects associated with the logical folder;
    generating a search query for the relational database, wherein the search query is configured to select respective portions of the content objects associated with the logical folder; and
    invoking the operation command over a plurality of result sets selected from issuing the search query multiple times to partition the operation command into separate operations, wherein the separate operations are applied to different portions of the content objects by:
        (a) issuing the search query to return a portion of the result sets corresponding to the respective portions of the content objects associated with the logical folder,
        (b) invoking the operation command to the portion of the result sets that is returned by the search query that was issued, and
        (c) repeating the steps of (a) and (b) by issuing a subsequent search query as the search query until the operation command that was received from the at least one of the users is completed, wherein the subsequent search query returns a subsequent portion of the result sets each time the search query reissues.

2. The method of claim 1, further comprising updating status metadata to indicate an operation status for the respective portion of the content objects associated with the logical folder.

3. The method of claim 2, further comprising repeatedly invoking the operation command on at least a portion of the result sets based at least in part on the operation status.

4. The method of claim 2, further comprising generating a revert query for the relational database based at least in part on the operation status.

5. The method of claim 2, wherein the operation status characterizes at least one of, a successfully completed status, or a pending completion status, or a queued status, or a failed status.

6. The method of claim 1, further comprising updating permissibility metadata to indicate an operation permissibility for the respective portion of the content objects associated with the logical folder.

7. The method of claim 6, wherein the operation permissibility is based at least in part on the operation command.

8. The method of claim 6, wherein the operation permissibility characterizes an association between the operation command and one or more concurrent operations on the content objects.

9. The method of claim 6, wherein the permissibility metadata further indicates a logical locking of at least one of, the logical folder, a parent folder of the logical folder, or at least one of the content objects associated with the logical folder.

10. The method of claim 1, wherein the search query comprises a returned item bound to determine at least one of the result sets.

11. The method of claim 10, wherein the returned item bound is a chunk size.

12. A computer readable medium, embodied in a non-transitory computer readable medium, the non-transitory computer readable medium having stored thereon a sequence of instructions which, when stored in memory and executed by a processor causes the processor to perform a set of acts, the acts comprising:

identifying a server in a cloud-based environment that is interfaced with one or more storage devices that store one or more content objects accessible by one or more users, wherein the content objects are identified by one or more hierarchical path identifiers comprising at least one folder identifier corresponding to a logical folder, and wherein the hierarchical path identifiers are stored in a relational database in the storage devices;

receiving an operation command from at least one of the users to operate on the content objects associated with the logical folder;

generating a search query for the relational database, wherein the search query is configured to select respective portions of the content objects associated with the logical folder; and invoking the operation command over a plurality of result sets selected from issuing the search query multiple times to partition the operation command into separate operations, wherein the separate operations are applied to different portions of the content objects by:
  (a) issuing the search query to return a portion of the result sets corresponding to the respective portions of the content objects associated with the logical folder,
  (b) invoking the operation command to the portion of the result sets that is returned by the search query that was issued, and repeating the steps of (a) and (b) by issuing a subsequent search query as the search query until the operation command that was received from the at least one of the users is completed, wherein the subsequent search query returns a subsequent portion of the result sets each time the search query reissues.

13. The computer readable medium of claim 12, further comprising instructions which, when stored in memory and executed by the processor causes the processor to perform acts of updating status metadata to indicate an operation status for the respective portion of the content objects associated with the logical folder.

14. The computer readable medium of claim 13, further comprising instructions which, when stored in memory and executed by the processor causes the processor to perform acts of repeatedly invoking the operation command on at least a portion of the result sets based at least in part on the operation status.

15. The computer readable medium of claim 13, further comprising instructions which, when stored in memory and executed by the processor causes the processor to perform acts of generating a revert query for the relational database based at least in part on the operation status.

16. The computer readable medium of claim 13, wherein the operation status characterizes at least one of, a successfully completed status, or a pending completion status, or a queued status, or a failed status.

17. The computer readable medium of claim 12, further comprising instructions which, when stored in memory and executed by the processor causes the processor to perform acts of updating permissibility metadata to indicate an operation permissibility for the respective portion of the content objects associated with the logical folder.

18. The computer readable medium of claim 17, wherein the operation permissibility is based at least in part on the operation command.

19. A system comprising:
  a storage medium having stored thereon a sequence of instructions; and
  a processor or processors that execute the instructions to cause the processor or processors to perform a set of acts, the acts comprising,
  identifying a server in a cloud-based environment that is interfaced with one or more storage devices that store one or more content objects accessible by one or more users, wherein the content objects are identified by one or more hierarchical path identifiers comprising at least one folder identifier corresponding to a logical folder, and wherein the hierarchical path identifiers are stored in a relational database in the storage devices;
  receiving an operation command from at least one of the users to operate on the content objects associated with the logical folder;
  generating a search query for the relational database, wherein the search query is configured to select respective portions of the content objects associated with the logical folder; and
  invoking the operation command over a plurality of result sets selected from issuing the search query multiple times to partition the operation command into separate operations, wherein the separate operations are applied to different portions of the content objects by:
    (a) issuing the search query to return a portion of the result sets corresponding to the respective portions of the content objects associated with the logical folder,
    (b) invoking the operation command to the portion of the result sets that is returned by the search query that was issued, and
  repeating the steps of (a) and (b) by issuing a subsequent search query as the search query until the operation command that was received from the at least one of the users is completed, wherein the subsequent search query returns a subsequent portion of the result sets each time the search query reissues.

20. The system of claim 19, wherein an operation status characterizes at least one of, a successfully completed status, or a pending completion status, or a queued status, or a failed status.

* * * * *